United States Patent
Wood et al.

(10) Patent No.: US 10,523,603 B2
(45) Date of Patent: Dec. 31, 2019

(54) SYSTEMS AND METHODS FOR INTERCEPTING ACCESS TO MESSAGING SYSTEMS

(71) Applicant: BMC SOFTWARE, INC., Houston, TX (US)

(72) Inventors: Dale G. Wood, Spring Branch, TX (US); Michael L. Perry, Austin, TX (US)

(73) Assignee: BMC Software, Inc., Houston, TX (US)

( * ) Notice: Subject to any disclaimer, the term of this patent is extended or adjusted under 35 U.S.C. 154(b) by 110 days.

(21) Appl. No.: 15/658,896

(22) Filed: Jul. 25, 2017

(65) Prior Publication Data

US 2018/0287972 A1    Oct. 4, 2018

Related U.S. Application Data

(60) Provisional application No. 62/480,250, filed on Mar. 31, 2017.

(51) Int. Cl.
| | | |
|---|---|---|
| *G06F 8/656* | (2018.01) | |
| *G06F 9/455* | (2018.01) | |
| *G06F 21/31* | (2013.01) | |
| *H04L 12/58* | (2006.01) | |
| *H04L 29/12* | (2006.01) | |
| *G06F 9/4401* | (2018.01) | |
| *H04L 9/32* | (2006.01) | |
| *H04L 29/06* | (2006.01) | |

(52) U.S. Cl.
CPC .......... *H04L 51/046* (2013.01); *G06F 9/4401* (2013.01); *G06F 9/4416* (2013.01); *H04L 61/2023* (2013.01)

(58) Field of Classification Search
None
See application file for complete search history.

(56) References Cited

U.S. PATENT DOCUMENTS

| | | | | |
|---|---|---|---|---|
| 6,546,485 | B1* | 4/2003 | Tsunedomi | G06F 8/656 |
| | | | | 713/100 |
| 2003/0041302 | A1* | 2/2003 | McDonald | G06F 17/2247 |
| | | | | 715/234 |
| 2007/0028001 | A1* | 2/2007 | Phillips | G06F 8/656 |
| | | | | 709/238 |

(Continued)

*Primary Examiner* — Nasser M Goodarzi
*Assistant Examiner* — Terrika Peterson
(74) *Attorney, Agent, or Firm* — Brake Hughes Bellerman LLP

(57) ABSTRACT

Systems and methods are provided that intercept access to mainframe computing systems' messaging systems. For example, a method may include using a replacement messaging interface adapter to intercept a messaging request being directed from a client program to a messaging interface module of a messaging subsystem that is identified by a messaging stub interface module that implements a documented messaging interface. The method may also include performing an auxiliary function on the messaging request. The method may additionally include transmitting the messaging request to the messaging interface module of the messaging subsystem. The method may further include receiving a response from the messaging subsystem. Additionally, the method may include providing the response to the client program.

20 Claims, 7 Drawing Sheets

(56) References Cited

U.S. PATENT DOCUMENTS

| | | | |
|---|---|---|---|
| 2008/0244077 A1* | 10/2008 | Canosa | H04L 67/125 709/227 |
| 2013/0179731 A1* | 7/2013 | Bates | G06F 11/1417 714/23 |
| 2014/0258256 A1* | 9/2014 | Dee | G06F 9/547 707/705 |
| 2016/0277439 A1* | 9/2016 | Rotter | H04L 63/0861 |

* cited by examiner

SYSTEMS AND METHODS FOR INTERCEPTING ACCESS TO MESSAGING SYSTEMS

RELATED APPLICATION

This application is a non-provisional of, and claims priority to, U.S. Provisional Application No. 62/480,250, filed Mar. 31, 2017, the disclosure of which is incorporated by reference in its entirety.

TECHNICAL FIELD

This disclosure relates generally to the field of messaging subsystems on mainframe computer systems. More particularly, but not by way of limitation, this disclosure refers to a method of intercepting access to messaging subsystems on a mainframe computer to, for example, provide additional capabilities.

BACKGROUND

Mainframe computers are large, multi-processor computing devices able to perform thousands of tasks every second. IBM® mainframes provide online transaction processing subsystems, such as Information Management System (IMS™), Time Sharing Option (TSO), and Customer Information Control System (CICS®) (IBM, IMS, and CICS are trademarks of International Business Machines Corporation), that enable high-speed transaction processing of data. Batch processes also entail transaction processing. Such subsystems often work with a messaging subsystem, such as the MQ messaging subsystem from IBM. The messaging subsystem may allow applications to send messages back and forth.

SUMMARY

Systems and methods are provided that intercept messaging requests from business application programs to a messaging subsystem interface (e.g., IBM® MQ messaging system interface). The interception of the messaging request can be used to perform auxiliary functions on the messaging request or to redirect the messaging request to a messaging subsystem that is not locally available. The messaging subsystem may be accessible from a remote logical partition of the same sysplex as the source of the messaging request or the messaging subsystem can be to remote mainframe computing systems anywhere in the world. Implementations provide such remote access without changes to the business application programs or the messaging subsystem.

In one general aspect, a mainframe computing system includes at least one general processor and a client program executing on the mainframe computing system. The client program is configured to make messaging requests via a messaging stub interface module that implements a documented messaging interface. The mainframe computing system also includes an interception subsystem that performs operations. The operations may include receiving a messaging request from the client program via a replacement messaging interface adapter. The messaging request may be directed to a messaging interface adapter module that is identified by the messaging stub interface module, and the replacement messaging interface adapter may be configured to intercept messages directed to the messaging interface adapter. The operations may also include performing an auxiliary function on the messaging request, transmitting the messaging request to a messaging subsystem, receiving a response from the messaging subsystem, and providing the response to the client program.

In another general aspect, a mainframe computing system includes at least one general processor, a transaction processing subsystem, a client program, and an interception subsystem. The client program may be configured to execute within the transaction processing subsystem and to make messaging requests via a messaging stub interface module that implements a documented messaging interface. The interception subsystem includes a server component, an intercept bootstrap module, and a replacement messaging interface adapter. The server component executes in a privileged mode and performs a server initialization routine prior to initialization of the transaction processing subsystem. The intercept bootstrap module is configured to execute during initialization of the transaction processing subsystem and to call the server component. The replacement messaging interface adapter is configured to replace a messaging interface adapter that is identified by the messaging stub interface module. Responsive to being called by the intercept bootstrap module, the server component may modify an entry point associated with the messaging interface adapter to point to the replacement messaging interface adapter.

In another general aspect, a computer-implemented method may include using a replacement messaging interface adapter to intercept a messaging request being directed from a client program to a messaging interface module of a messaging subsystem that is identified by a messaging stub interface module that implements a documented messaging interface. The method may also include performing an auxiliary function on the messaging request. The method may additionally include transmitting the messaging request to the messaging interface module of the messaging subsystem. The method may further include receiving a response from the messaging subsystem. Additionally, the method may include providing the response to the client program.

The details of one or more implementations are set forth in the accompanying drawings and the description below. Other features will be apparent from the description and drawings, and from the claims.

DETAILED DESCRIPTION

Figure 1:
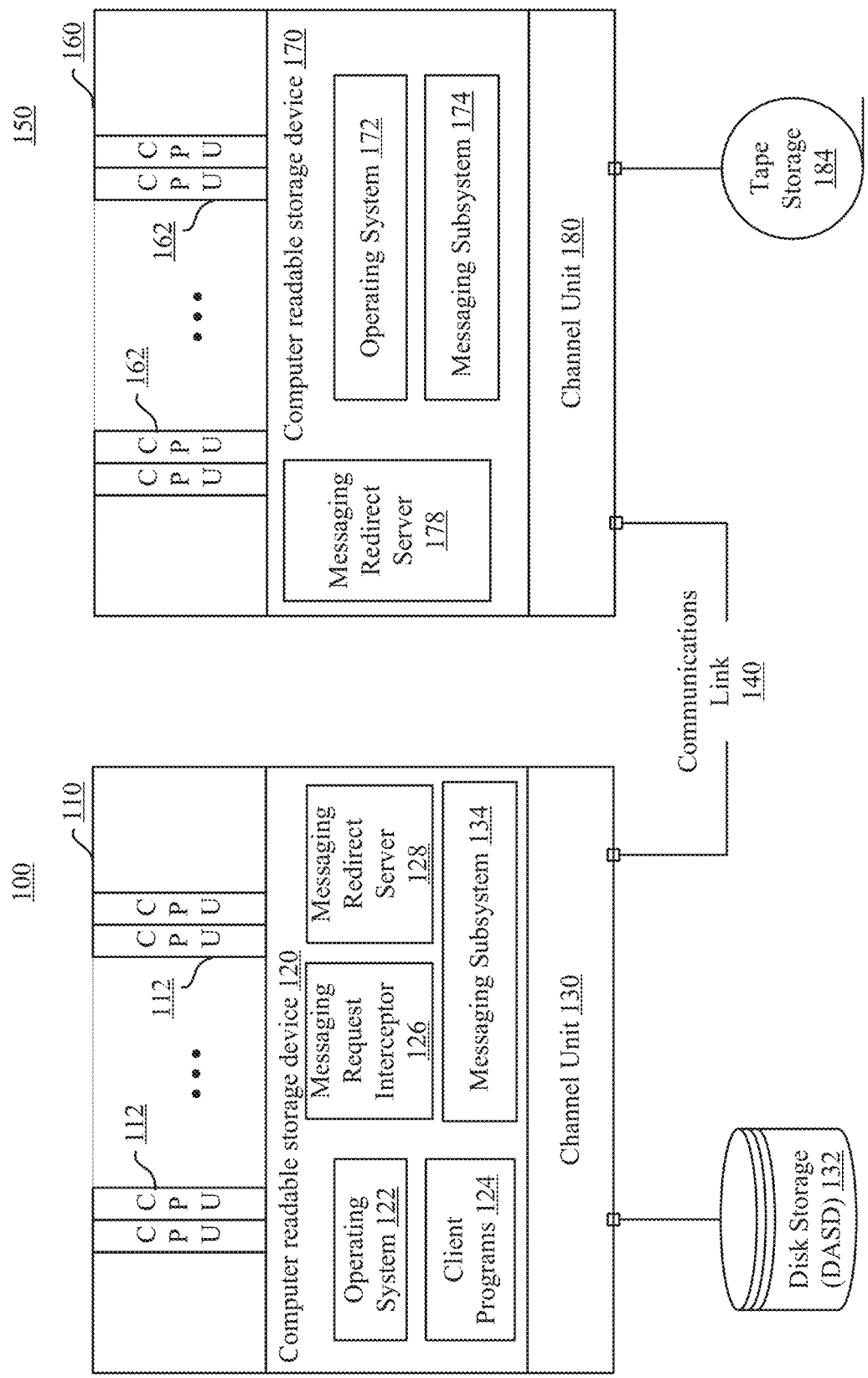
FIG. 1 is a block diagram that illustrates an example of a computing system in accordance with disclosed implementations.

Mainframe computing systems are often divided into multiple logical partitions (LPARs). An LPAR is a logical segmentation of a mainframe's memory and other resources that allows the LPAR to run its own copy of an operating system and associated applications, making the LPAR, in practice, equivalent to a separate mainframe. An LPAR can include a messaging subsystem that allows client applications to communicate. For example, an IBM zSystems® series mainframe computing system can include the IBM MQ messaging middleware as a message system that allows communication between client applications.

Some mainframe computing systems are configured so that client applications are only able to access a messaging subsystem that is running locally on the same LPAR as the client application. For example, currently the IBM MQ messaging subsystem must run on the same mainframe as the requesting application. This results in multiple installations of the messaging subsystem at a customer site, for example on multiple LPARs within a sysplex so that client applications running on each of the LPARs can access a messaging subsystem. The multiple installations can be problematic because of the increased support burden and licensing requirements.

Disclosed implementations include an interception subsystem that intercepts access to a local messaging subsystem to provide additional functionality, such as redirection to a messaging subsystem running on a remote mainframe computing system. The interception subsystem can also provide other auxiliary functionality, alone or in combination, such as auditing, performance monitoring, resource utilization analysis, encryption, content addition, content removal, string replacement, access control, compression, translation, etc.

In some implementations, the interception subsystem enables remote messaging subsystem access and provides a communication link for messaging subsystem requests. The interception subsystem can be used with other mainframe subsystems, such as CICS and IMS and with batch business application programs, such as BMP, DLI, DBB, etc. The processes that use the messaging access interface are considered client programs.

The interception subsystem operates transparently to the client programs that use the messaging subsystem access interface. In other words, when the interception subsystem redirects the message request to a different mainframe the requesting client program does not know that the messaging subsystem it receives data from is remote, and the messaging subsystem responding to the request does not know that the request came from a different mainframe. As discussed above, this allows fewer installations of the messaging subsystem without requiring changes to the client programs. This can be especially important for allowing legacy application programs, for which source code can be unavailable or undesirable to modify, to take advantage of lower processor cycles and administrative overhead. Similarly, the client programs may be unaware that the interception subsystem is performing any auxiliary functions on the intercepted messaging requests.

FIG. 1 illustrates a high level block diagram of an example mainframe computing system with a messaging request interceptor that can be used, for example, to provide access to a remote messaging subsystem. FIG. 1 illustrates two mainframe computing systems 100 and 150. Mainframe computers are large, multi-processor computing devices that are able to perform thousands of tasks every second. Because of their large size and significant processing power, usage of processing time is often tracked and customers are billed based on their processor usage. In some implementations, system 100 and system 150 are two LPARs in a sysplex. An LPAR is a logical segmentation of a mainframe's memory and other resources that allows it to run its own copy of an operating system and associated applications, making the LPAR, in practice, equivalent to a separate mainframe. LPARs may be enabled via special hardware circuits or purely through software. A system administrator can assign one or more system processors for the exclusive use of an LPAR. Alternately, the administrator can allow all processors to be used on some or all LPARs. LPARs may also allow multiple system images (of the same operating system or different operating systems) to run in one machine. Furthermore, each LPAR can execute one or more subsystems within an operating system. A sysplex is a collection of LPARs that cooperate to process work. LPARs in a sysplex may be able to communicate with each other using Cross-system Coupling Facility ("XCF") communications. Thus, although referred to as mainframe computing system 100 and mainframe computing system 150, it is to be understood that mainframe computing system 100 and mainframe computing system 150 may be logical partitions of a single physical mainframe computer.

In some implementations, system 100 and system 150 may be mainframes that are physically and logically distinct from and/or geographically separated from one another. Although alternatives are possible, the mainframe computing systems 100 and 150 in FIG. 1 are described as IBM zSystems® series (zSeries) mainframes. It should be understood, however, that implementations of the technology described herein are not limited to IBM zSeries mainframes.

The mainframe computing systems 100 and 150 can include one or more processors configured to execute one or more machine executable instructions or pieces of software, firmware, or a combination thereof. In some implementations, the processor frame, such as frame 110 and 160, may include multiple central processing units (CPUs) (112 and 162). In some implementations, the CPUs include one or more General Processors (GPs) and one or more zSeries Integrated Information Processors (zIIPs). The operating system, such as operating system 122 or 172, may direct various workloads to the GPs and various other workloads to the zIIPs.

The mainframe computing systems 100 and 150 may also include one or more computer readable storage devices, such as devices 120 and 170. The computer readable storage devices may include main memory, cache, or disk storage, configured to store data and/or applications, either temporarily, permanently, semi-permanently, or a combination thereof. The storage devices may include volatile memory, non-volatile memory, or a combination thereof. The mainframe computing systems 100 and 150 can include an operating system, such as operating system 122 and operating system 172. The operating system can be the z/OS® operating system or some other mainframe operating system. The mainframe computing system 100 may include one or more client programs 124. Client programs 124 may include any code written to execute on the mainframe computing system 100. For example, client programs 124 may include mainframe subsystems, such as CICS, IMS, and Resource Access Control Facility (RACF), vendor-supplied business application programs, batch programs and other proprietary programs.

The mainframe computing system 100 may also include a messaging request interceptor 126 and a messaging redirect server 128, which together comprise a messaging interception subsystem. The messaging request interceptor 126 may intercept a messaging request made by a client program, such as CICS, IMS, DB2®, or a business batch application. The client program may set up the messaging request as if using a messaging interface of the messaging subsystem, e.g., a documented messaging interface to the IBM MQ messaging subsystem, and may have no indication that the messaging request will be handled by the messaging request interceptor 126 rather than the messaging interface of the messaging subsystem. The messaging request interceptor 126 may receive the messaging request and, for example, redirect the messaging request to a messaging subsystem on another mainframe computing system using the messaging redirect server 128. Alternatively or additionally, the messaging request interceptor 126 can perform auxiliary functions based on intercepted messaging requests, such as recording audit information, monitoring performance, modifying the messaging requests, providing access control, translating the messaging requests, encrypting the messaging requests, compressing the messaging requests, etc. The messaging redirect server 128 may be configured as a client-side server that forwards requests to a server-side messaging redirect server, e.g., messaging redirect server 178, and processes a response received from the server-side messaging redirect server. In at least some implementations, the messaging request interceptor 126 passes intercepted messaging requests to a messaging subsystem 134 after performing one or more auxiliary functions based on the intercepted messaging requests. In these implementations, the interception subsystem may not include the messaging redirect server 128, and the mainframe computing system 100 may operate independently of the mainframe computing system 100 with respect to messaging requests.

The mainframe computing system 150 may include a messaging redirect server 178. The messaging redirect server 178 may be configured as a server-side redirect server that receives a messaging request from a client-side messaging redirect server, e.g., messaging redirect server 128, transmits the messaging request to a messaging subsystem for processing, receives a response from the messaging subsystem, and sends the response back to the client-side messaging redirect server. In some implementations, the messaging redirect server 128 and the messaging redirect server 178 may be configured to serve as both a client-side and a server-side messaging redirect server. In other words, the messaging redirect server 128 may also be configured to act as the messaging redirect server 178, and the messaging redirect server 178 may be configured to act as the messaging redirect server 128. The mainframe computing system 150 may also include one or more messaging subsystems 174.

Although many of the examples herein relate to redirecting messaging requests from the mainframe computing system 100 to the mainframe computing system 150, other implementations are possible too. For example, the mainframe computing system 100 includes the messaging subsystem 134 in at least some implementations. In these implementations, the messaging request interceptor 126 intercepts messaging requests, performs one or more auxiliary functions on the intercepted message, and then passes the messaging request to the local messaging subsystem, e.g., messaging subsystem 134, on the mainframe computing system 100.

In some implementations, the mainframe computing system 100 and mainframe computing system 150 may also include a channel unit, such as channel unit 130 and channel unit 180, for processing Input/Output (I/O) requests. The channel unit may include a communications link 140, which may be a telecommunications link, a network interface, a communication bus, or some other communication link. For example, mainframe computing system 100 and mainframe computing system 150 may communicate with each other using XCF, TCP/IP, Systems Network Architecture ("SNA"), or other communication protocols over communications link 140. The channel unit may also include a tape storage unit 184 and/or a disk storage device 132 sometimes referred to as a Direct Access Storage Device (DASD). In some implementations, mainframe computing system 100 may include one or more other hardware components not shown in FIG. 1, such as for example, a display or monitor, a keyboard, a touchscreen, a camera, a mouse, a touchpad, a trackpad, a video processor, etc., through which a user may send data to and receive data from mainframe computing system 100 or mainframe computing system 150. In some implementations, the user may use a second computing device (not shown) in communication with mainframe computing system 100 via a communications network to send data to and receive data from mainframe computing system 100. The user may also communicate with mainframe computing system 150 in a similar manner.

Figure 2:
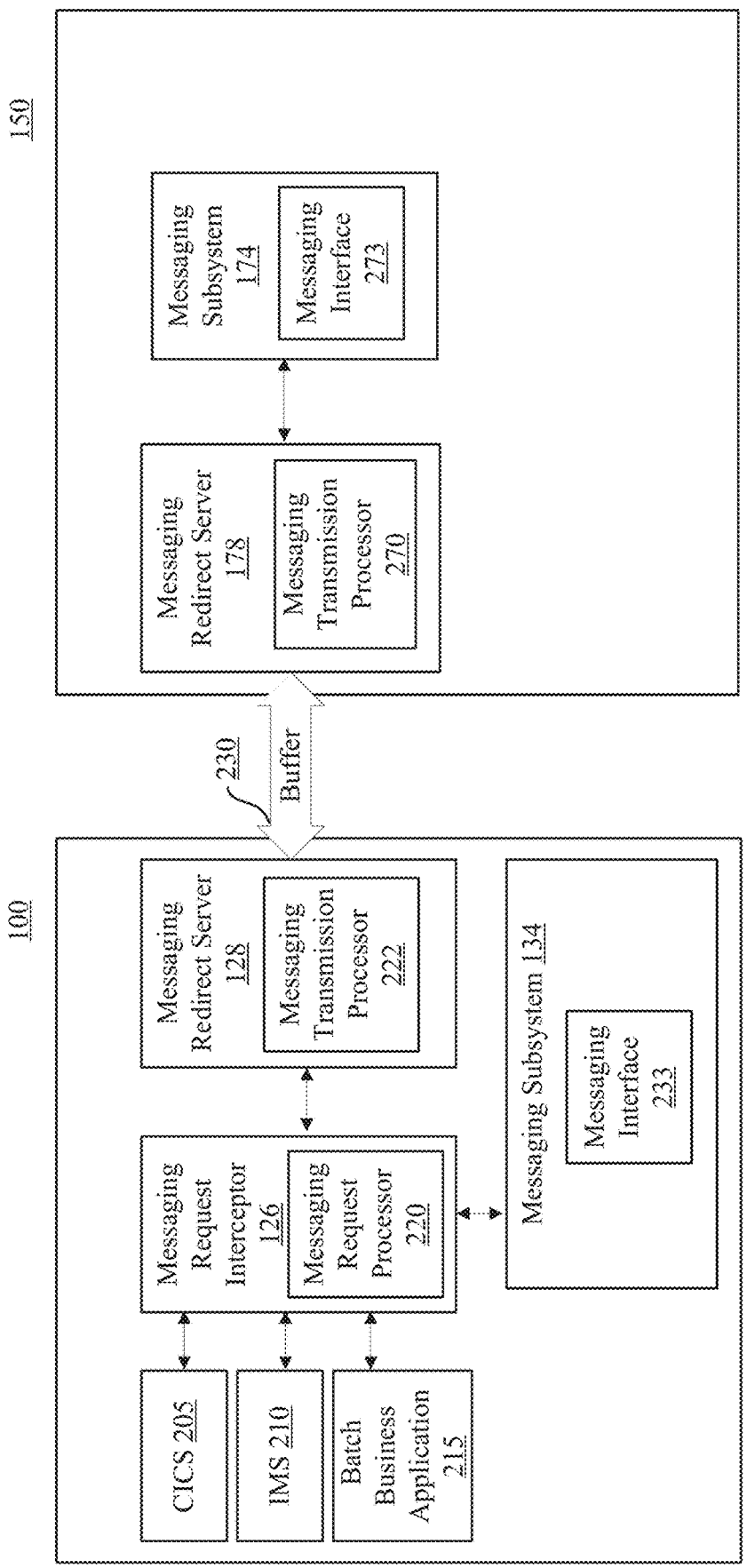
FIG. 2 is a block diagram illustrating example modules within the messaging redirect subsystems of the mainframes of FIG. 1, in accordance with some implementations.

FIG. 2 is a block diagram that illustrates example modules within the messaging redirection subsystems of the mainframes of FIG. 1, in accordance with some implementations. In the example of FIG. 2, the client programs 124 of FIG. 1 include a CICS subsystem 205, an IMS subsystem 210, and a batch business application 215. In some implementations other types of client programs are also included, such as database client applications (e.g., the IBM DB2 database). Each client program may initiate one or more messaging requests having a format expected by the messaging interface provided by the messaging subsystem, such as a messaging interface 233 of the messaging subsystem 134 on the mainframe computing system 100, or a messaging interface 273 of the messaging subsystem 174 of the mainframe computing system 150. The messaging interface 233 and the messaging interface 273 may be configured to receive messages that are formatted according to a documented format. These messaging requests are intercepted and handled by the messaging request interceptor 126 instead of the messaging interface 233 provided by the messaging subsystem 134. For example, a mainframe administrator may start an intercept bootstrap module of the messaging request interceptor 126 before any client programs are started. The intercept bootstrap module may replace references to one or more messaging interface adapters, also referred to as messaging identify modules, of the messaging interface 233 with references to components of the messaging request interceptor 126. For example, the intercept bootstrap module may replace references to a CSQ3ID00 module that acts a messaging interface adapter for client programs running in the CICS subsystem with a reference to a replacement CSQ3ID00 module (e.g., an interceptor identify module) of the messaging request interceptor 126, as explained in more detail with regard to FIG. 5. Additionally or alternatively, the intercept bootstrap module may replace one or more other references to modules of the messaging subsystem 134 with a reference to a module of the messaging request interceptor, e.g., modules for messaging from IMS and batch applications, in a similar manner. This replacement may cause the system 100 to use the messaging request interceptor 126 instead of the messaging interface 273 provided by the messaging subsystem 174, such as an IBM MQ messaging subsystem interface, to handle messaging requests.

In some implementations, the CICS subsystem 205 may connect to the messaging subsystem, either on start-up or in response to an operator command. For example, the CICS subsystem 205 may call an identify module for the messaging subsystem, e.g., a CSQ3ID00 module, which as described above has been replaced by a reference to an identify module in the messaging request interceptor 126. The call includes a function request block (FRB) parameter list that indicates how the CICS subsystem 205 wishes to identify itself to the messaging subsystem. The identify module in the messaging request interceptor 126 may then forward the connection request to the messaging redirect server 128 so that the redirect server 128 can use the FRB parameter list to connect with a remote messaging subsystem, e.g., by sending the request to messaging redirect server 178, which connects to a local messaging subsystem 174 using the identify module. In some implementations, the messaging request interceptor 126 may connect with a local messaging system, e.g., messaging subsystem 134. The messaging subsystem (e.g., 174 or 134) provides a return code and program call (PC) number to be used in communication requests in the FRB list. The messaging request interceptor 126 stores this PC number, but returns a different PC number to the CICS subsystem 205 in the FRB list. The PC number returned in the FRB list is the PC number of a main processing module for the messaging request interceptor 126.

Subsequent to connection, the CICS subsystem 205 may send a message request using a documented messaging interface, e.g., MQGET. Because the CICS subsystem 205 is connected to the messaging request interceptor 126 rather than to the messaging subsystem, the messaging request interceptor 126 receives the message request. In some implementations, the messaging redirect server 128 may perform one or more auxiliary functions before relaying the message to the messaging subsystem. The messaging request interceptor 126 may then forward the message to the appropriate messaging subsystem, which can be local, e.g., messaging subsystem 134, or remote, e.g., messaging subsystem 174. In this manner, the communication with the remote messaging subsystem and/or the performance of the auxiliary functions is transparent to the client application, i.e., the application running in the CICS subsystem 205. Similarly, the messaging request interceptor 126 may be configured (e.g., by an administrator) to intercept the connection of the IMS subsystem 210 and/or batch business application 215 to the messaging subsystem so that when the IMS subsystem 210 and/or batch business application 215 makes a messaging request, the messaging request is intercepted by the messaging request interceptor 126.

The messaging request interceptor 126 may include a messaging request processor 220 to perform auxiliary functions on the messaging request. In some implementations, the messaging request processor 220 records audit information about the messaging request, such as the number of and/or type of messaging requests received from particular client applications and/or users. The audit information can be stored in, for example, a database or a file stored on a filesystem.

The messaging request processor 220 can also encrypt/decrypt messaging data or compress/decompress the messaging request or portions thereof. Additionally or alternatively, the messaging request processor 220 can add, remove, or replace a portion of the content of the messaging request. For example, the messaging request processor 220 can remove personal data such as a social security number from a particular field in the messaging request before directing the request to the destination messaging subsystem. For example, the content of a particular field of a messaging request that would typically contain personal/confidential information may be modified to change or remove the personal/confidential information. As another example, some or all of the content of a messaging request may be searched or evaluated using a pattern (e.g., a regular expression) to identify content that appears to be personal/confidential. As another example, the messaging request processor 220 can replace production data included in the message with innocuous or dummy data. In some implementations, these example auxiliary functions that modify the content of a messaging request are used to sanitize data for use in testing environments.

Another example of an auxiliary function that is performed in some implementations is language translation of at least some of the content of a messaging request. For example, the auxiliary function may translate one or more parameters of the messaging request from a first language to a second language using conventional translation techniques. For example, the documented interface that defines the structure of messaging requests is used in some implementations to identify parameters that contain human readable content in a first language. This content can then be processed by a translation engine to translate the content from the first language to a second language.

Another example of an auxiliary function is performance monitoring. In some implementations, the messaging request interceptor 126 may measure the time between transmitting a messaging request to a messaging subsystem (e.g., messaging subsystem 134 or messaging subsystem 174) and receiving a response. In some implementations, a performance log may be generated that includes average times for various requests. In some implementations, an alert may be triggered if the measured performance meets certain conditions. For example, the conditions may be defined in terms of an absolute time threshold, a percentile deviation from an established typical performance metric, etc. In some implementations, the messaging request interceptor 126 may also capture information about resource utilization for the messaging requests, such as memory or processor utilization to complete the request. This resource utilization information may be stored in a database or on a file system. In some implementations, when resource utilization deviates from an expected value an alert may be issued.

Another example of an auxiliary function is access control. In some implementations, the messaging request interceptor 126 may evaluate whether the client application that is making the messaging request has sufficient permissions to make the request. For example, the permissions may be evaluated by comparing a user identifier associated with the client application with a permission record that identifies which commands are available to which users.

The messaging request interceptor 126 may direct the messaging request to the appropriate messaging subsystem, which may include transmitting the messaging request to the messaging redirect server 128, which directs the messaging request to the appropriate messaging subsystem and returns the response from the messaging subsystem.

The messaging redirect server 128 may include a messaging transmission processor 222 that receives a messaging request from the messaging request interceptor 126 and prepares the messaging request for transmission to a remote messaging subsystem. For example, the messaging transmission processor 222 prepares the parameters in the messaging request for transmission to the remote messaging subsystem. The messaging transmission processor 222 can package the data that is referenced in parameters of a messaging request by recursively identifying the data sections of any control blocks referenced in the parameters and the data sections of any additional control blocks referenced by those control blocks. Identifying the data sections for packaging may include determining the type of messaging request being made and determining the parameters for that type of messaging request. In some aspects, the type of messaging request is defined by a command name and command version. The command name and version can be used to determine whether any parameters of the command include data that is passed indirectly (e.g., by specifying the location of a control block containing the data). The data stored in these control blocks can be retrieved for packaging and transmission to the receiving system. All of the identified data sections can then be packaged into a data structure in a buffer 230 for transmission to the remote messaging subsystem. In these implementations, the messaging redirect server 178 that receives the redirected messaging request may perform a reverse process of reconstructing the various control blocks that serve as parameters to the messaging request from the received data structure.

The messaging redirect server 128 may send the request to the destination system using any number of communication protocols. For example, if mainframe computing system 100 and mainframe computing system 150 are LPARs within the same sysplex, the messaging redirect server 128 may send the request using XCF, which is a high-speed communications protocol for LPARs within a sysplex. If mainframe computing system 100 and mainframe computing system 150 are geographically remote, redirect server 128 may send the request using TCP/IP or SNA protocols.

When redirect server 178 receives a request, a messaging transmission processor 270 may unpack the data from the buffer 230 into appropriate data structures for use as parameters in a messaging request to the messaging subsystem 174. For example, the messaging transmission processor 270 may transmit the messaging request to a messaging interface 273 of the messaging subsystem 174. The messaging redirect server 178 will function as a client application of the messaging subsystem 174. In this manner, the messaging subsystem 174 will not need to be modified to receive messaging requests from a remote mainframe computing system. Example methods for receiving and handling messaging requests that originate from a remote mainframe computing system are discussed further with respect to at least FIG. 4.

When the messaging redirect server 178 receives a response to the messaging request, the messaging redirect server 178 will transmit that response back to the messaging redirect server 128. If necessary, the messaging transmission processor 270 will package the data of the response (e.g., by recursively packaging the control blocks referenced in the response and the data stored therein) in a similar manner to the way the request was packaged by the messaging transmission processor 222. The response buffer may be communicated back to the requesting system using the communication protocol used to receive the request.

Figure 3:
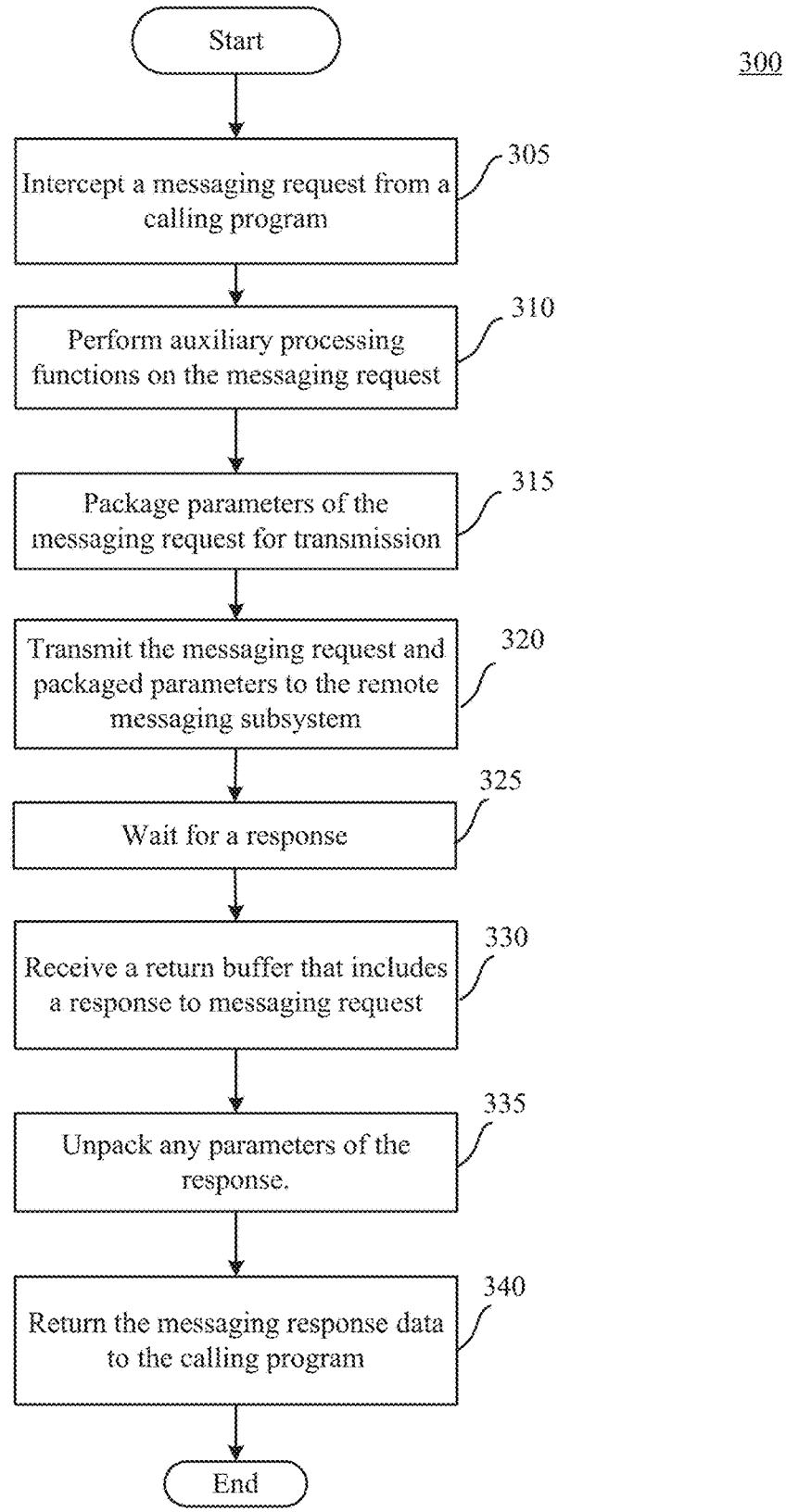
FIG. 3 is a flowchart illustrating a client-side process for intercepting messaging requests, according to an implementation.

FIG. 3 is a flowchart of a client-side process 300 for intercepting a messaging request to provide access to a remote messaging subsystem, according to an implementation. In one implementation, the process 300 may be invoked by a client program running on an IBM zSeries mainframe, such as mainframe computing system 100 shown in FIG. 1. In some implementations, the process 300 may be performed by a client-side messaging redirection subsystem, such as the messaging request interceptor 126 and messaging redirect server 128 of FIGS. 1 and 2. The client program may be a program from a mainframe subsystem such as CICS, IMS, DB2, or a batch business application, or some other process that uses any documented messaging request format to access a messaging interface of a messaging subsystem.

At 305, the messaging request interceptor 126 intercepts a messaging request made by the client program. The messaging request may include a particular messaging command and parameters for that command.

The messaging redirect server may perform one or more auxiliary processing functions on the messaging request (310). Examples of auxiliary processing functions include, but are not limited to, auditing, performance monitoring, resource utilization analysis, encryption, content addition, content removal, string replacement, compression, translation, etc.

The messaging request processor may then package the parameters of the messaging request for transmission (315). Packaging the parameters may include copying data from control blocks that are referenced in parameters to a data structure that can be transmitted to the remote messaging subsystem. Because the control blocks can reference other control blocks, packing the parameters can include recursively processing control blocks that are referenced in the parameters of the control block.

The messaging request and packaged parameters may then be transmitted to the remote messaging subsystem (320). The request and parameters can be transmitted using any data communication protocol available for communication with the mainframe computing system upon which the remote messaging subsystem is running.

The messaging redirect server may then wait for a response (325). When the destination system returns the response, the messaging redirect server may receive a return buffer (330). The return buffer may include the response and any data associated with parameters of that response.

The messaging redirect server may then unpack any parameters of the response (335). For example, the data included with the response may be copied into new or existing control blocks. The response can then be updated to reference those control blocks.

The redirect server may then return the messaging response, including the unpacked response parameter data, to the client program that initiated the request (340). The response may be in a format used by the messaging subsystem, so that the client program is not aware that the request was intercepted by the messaging redirect request system. Thus, the messaging request interceptor and messaging redirect server allow remote access to a messaging subsystem without requiring changes to the underlying requesting programs.

Figure 4:
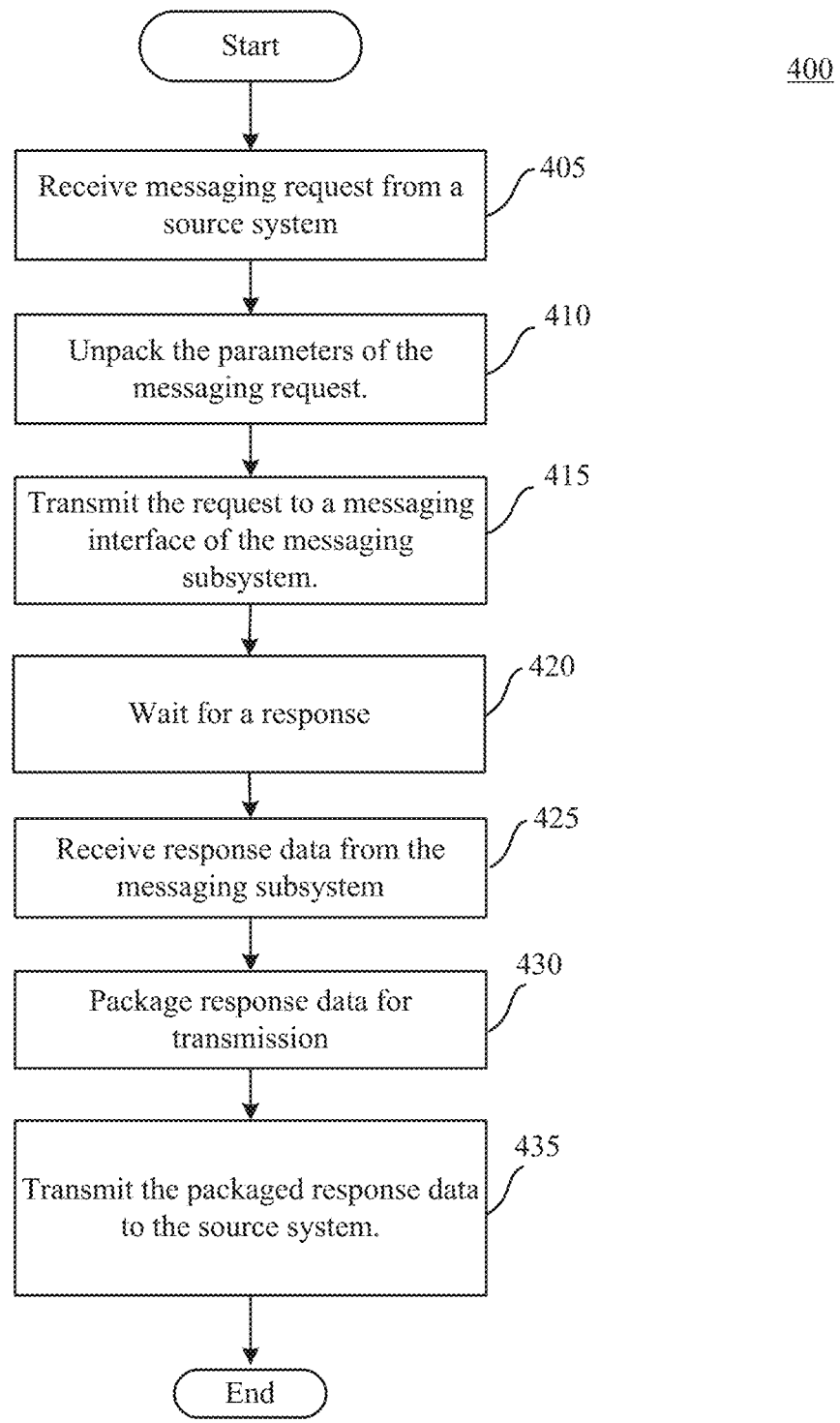
FIG. 4 is a flowchart illustrating a server-side process for responding to a client-side messaging request, according to an implementation.

FIG. 4 is a flowchart illustrating a server-side process 400 for responding to a client-side request for remote access to a messaging subsystem, according to an implementation. A messaging redirect server running on a mainframe with a messaging subsystem, such as redirect server 178 of FIGS. 1 and 2 may perform process 400 after receiving a messaging request from a client-side (or requesting) messaging redirect server.

At 405, the messaging redirect server may receive a messaging request from a source system. The source system may be a mainframe system running a client program, such as a batch process, a CICS transaction, or an IMS transaction that requests access to a messaging subsystem. The source system is remote from the system running the messaging subsystem. For example, the source system may be an LPAR different than the LPAR running the messaging subsystem, or the source system may be a different mainframe than the mainframe running the messaging subsystem.

The messaging redirect server may then unpack parameter data included with the messaging request (410). Unpacking the parameter data may include copying data into control blocks on the receiving system. Unpacking may also involve updating the parameters of the messaging request to include references to the control blocks. Because control blocks can include data and references to other control blocks, unpacking the parameters may be a recursive process in which multiple levels of control blocks are created based on the parameter data received from the source system. After the parameter data is unpacked, the messaging request may appear to have originated locally on the receiving system.

The messaging redirect server may then transmit the messaging request, including the unpacked parameters (e.g., references to local control blocks) to an interface of the messaging subsystem (415). The messaging interface may be an interface to the message subsystem that is ordinarily used by client applications to interact with a messaging subsystem. For example, the messaging interface may be a documented interface. In this manner, the messaging subsystem does not need to be changed to receive messaging requests that originate from remote mainframe computing systems.

The messaging redirect server then waits for a response (420). When the messaging subsystem has completed its processing, the messaging subsystem sends the response back to the messaging redirect server as though the messaging redirect server were a client application. Thus, the redirect server receives the response from the messaging subsystem (425). The response may include data from the messaging subsystem, including references (pointers) to control blocks containing response data.

The messaging redirect server may then package the response data for transmission to the source system (430). In some implementations, this may involve recursively copying data from control blocks referenced in the response data to a data structure that can be transmitted to the source system.

The messaging redirect server may then transmit the packaged response data to the source system (435). Process 400 then ends.

Figure 5:
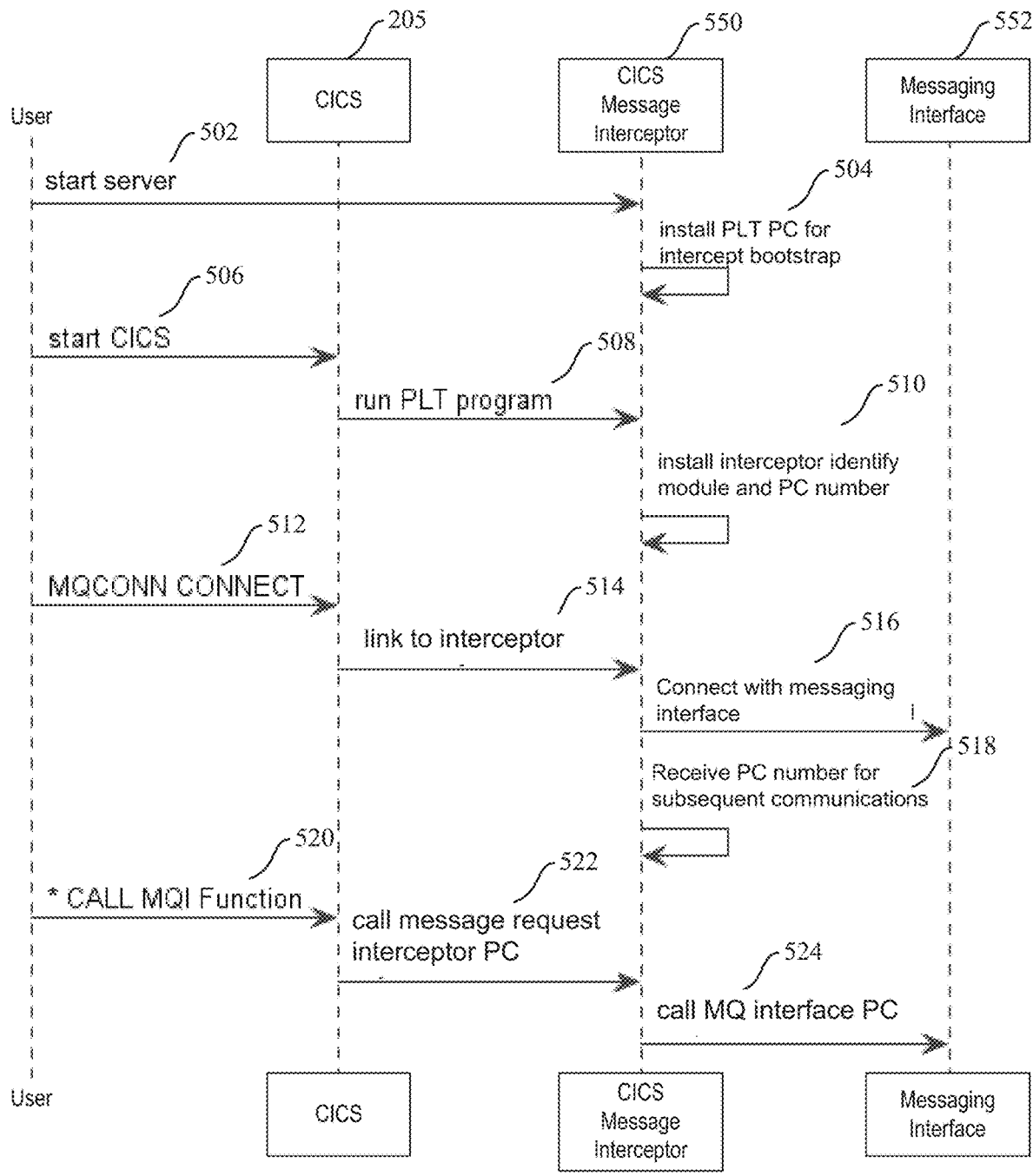
FIG. 5 is a sequence diagram of an example process of intercepting messaging requests originating in CICS, according to an implementation.

FIG. 5 is a sequence diagram 500 of an example process of intercepting messaging requests originating in CICS. The sequence diagram 500 shows a series of operations performed or initiated by user actions. As shown in the diagram, the operations are variously performed by users, the CICS subsystem 205, a CICS interceptor 550, and a messaging interface 552. The CICS message interceptor 550 is one example of the messaging request interceptor 126. The messaging interface 552 is a documented interface to the messaging subsystem, e.g., the IBM MQ messaging subsystem, that can receive messaging requests that are formatted according to a documented format and is an example of the messaging interface 273. Although the sequence diagram shows a single user, the operations shown therein may be performed by multiple different users. For example, some of the operations may be performed by a system administrator while other operations are performed by a user of a client application.

A user, such as a system administrator, starts a server component of the CICS message interceptor 550 (502). This server component is started before the client subsystem (e.g., CICS). In some implementations, the server component is started with or otherwise provided with an enhanced authorization level, such as Authorized Program Facility (APF) authorization, so the server component can run in a privileged mode, such as supervisor state, when needed. The enhanced authorization level allows the server component to execute in a privileged mode that allows the server component to perform actions that could not be performed when running in a standard or user mode (e.g., modifying operating system components or components of separate subsystems).

Some implementations of the server component of the CICS message interceptor 550 initialize and generate two program call (PC) numbers. PC numbers are instructions that can branch to a routine in a different state, address space, or authority level. The first program call number is generated for an intercept bootstrap module of the CICS message interceptor 550 and is added to a Program List Table (PLT). A PLT includes a list of modules that are to be run during initialization of the CICS subsystem 205. For example, the server component of the CICS message interceptor 550 can load the intercept bootstrap module of the CICS message interceptor 550 into common storage and install a Program Call (PC) number for the intercept bootstrap module to the Program List Table (PLT) (504). Based on this first PC number being added to the PLT, the CICS subsystem 205 will call the intercept bootstrap module during initialization.

As described later at 510, the intercept bootstrap module will call back to the server component to cause the server component to install the interceptor identify module and PC number. To allow the intercept bootstrap module to call the server, the server initializes and generates a second PC number that the intercept bootstrap module will use. For example, the CICS message interceptor 550 can allocate a control block in common storage, generate a second PC number for a program call routine of the server component, store the second PC number, and create a system level named token that points to the control block allocated in common storage. The system level named token may be stored by a name/token service of the mainframe computing system. The system level named token can have any name, so long as the name is stored for later use. The system level named token can be used later to access the second PC number by requesting the token associated with the name. For example, the intercept bootstrap module can access the second PC number in this manner.

At 506, a user starts the CICS subsystem 205. During startup, the CICS subsystem 205 starts the routines listed in the PLT. The CICS subsystem 205 issues program calls based on the PC numbers in the PLT (508). One of the programs called during initialization is the intercept bootstrap module due to the server component adding the first PC number to the PLT. The interceptor bootstrap module looks up the named token that was stored at 504 to retrieve the PC number of the server component of the CICS message interceptor 550 and uses the PC number to call the server component, which runs in supervisor mode. In this manner, the interceptor bootstrap module enables the server component to perform configuration operations that require supervisor mode.

At 510, based on being called by the intercept bootstrap module, the server component loads the replacement identify module into common storage and generates a PC number for the replacement identify module. This PC number can be used to identify the adaptor to the operating system in an entry point directory. For example, the operating system may use an entry point directory to look up the PC number for a branch to the messaging identify module. The server component finds the entry point of the messaging identify module, e.g., in the entry point directory, saves this entry point, and changes the entry point to the entry point for the replacement identify module. In other words, the intercept bootstrap module changes the entry point address of the messaging identify module to point to the interceptor identify module.

Additionally, the server component of the CICS message interceptor 550 loads the main processing module of the messaging request interceptor, which creates a PC number for the main module. This main processing module can also be referred to as the messaging request processor of the messaging request interceptor. The intercept bootstrap module saves this PC number for later use. The CICS subsystem 205 may continue with the other initialization tasks, as outlined in the PLT.

At 512, a connection request may be initiated. The connection request may result from an explicit user command or from a preset initialization parameter. In response to the connection request, the CICS subsystem 205 attempts to start a connection by linking to the entry point address associated with the messaging system identify module, which was changed in step 510 to link to the interceptor identify module (514). The interceptor identify module enables the CICS message interceptor 550 to connect with the messaging subsystem (516). The message interceptor 550 can connect with any number of messaging subsystems, e.g., connecting with a local messaging subsystem, connecting with a remote messaging subsystem on another LPAR in the sysplex, or connecting with another LPAR outside of the sysplex. As part of the connection process, the messaging subsystem returns a PC number for the messaging system interface 552 in a function request block (FRB). This PC number is used for subsequent communication with the messaging subsystem. The interceptor identify module stores this PC number for future communications with the messaging interface 552. The interceptor identify module also replaces the PC number in the FRB with the PC number of the messaging request processor. This PC number was saved as part of step 510. The interceptor identify module then provides the modified FRB to the CICS subsystem 205, completing the messaging system connection. Thereafter, when a call is made to the messaging system interface, CICS accesses the FRB and uses the PC number associated with the messaging request interceptor component of the CICS message interceptor 550.

At 520, a user, such as CICS application program, runs a CICS transaction that issues a messaging request via a call to the documented messaging interface, e.g., a call such as MQGET. For example, the CICS transaction may be performed by a client program that statically links to a messaging stub interface module that implements the documented messaging interface. The message stub module that is statically linked with the CICS application programs contains entry points which correspond to the call name. An MQOPEN call from the application program will link to an MQOPEN entry point in the stub. The stub in turn passes along the caller's parameters to a resource manager interface (RMI) routine in the executing CICS region. The locating of the RMI routine is a dynamic process and based upon the TCB the CICS transaction is running on. The messaging stub interface module uses the PC number of the messaging request processor that was provided in the FRB to CICS subsystem 205, e.g., at step 518.

Accordingly, a messaging system program request handler of the CICS-messaging system adapter, such as the DFHMQTRU module of the MQ subsystem, will call the routine tied to the PC number that was stored in the FRB at 518 (i.e., the MQ program request handler will call the messaging request interceptor) (522). The messaging request interceptor will call the messaging interface 552 using the PC number stored during step 518 (524). The CICS message interceptor 550 can examine the messaging request both before and after calling the messaging interface 552 itself and can cause the messaging request processor 220 to perform auxiliary functions on the message request. In some implementations, the CICS message interceptor 550 also redirects the message request to a remote messaging subsystem using the messaging subsystem 174.

Further, in some implementations, the CICS uses a first adapter module, e.g., DFHMQCON, to handle the connection process to the messaging subsystem, a second adapter module, e.g., DFHMQDSC, to handle the disconnection process from the messaging subsystem, and a third adapter module, e.g., DFHMQTRU, to handle the actual messaging system interface calls that are made by application programs running on CICS.

Some implementations allow a user or the CICS system to switch from using the CICS message interceptor 550 back to accessing the messaging interface 552 directly. In this manner, if the interceptor process is not working (e.g., due to a server not running) the applications that use the messaging subsystem can continue to run. For example, if the connection to the messaging system fails due to any error, the CICS Message interceptor 550 may recognize the failure, or any other error that causes the absence of a proper interceptor environment and can redirect the connection request to the identify module (e.g., CSQ3ID00). This can occur because the intercept bootstrap module saves the entry point of the identify module and can therefore branch to that routine.

For example, some implementations of the CICS message interceptor 550 include a bypass module that client applications can expressly call to bypass the intercept process described above and call the messaging interface 552 directly.

Figure 6:
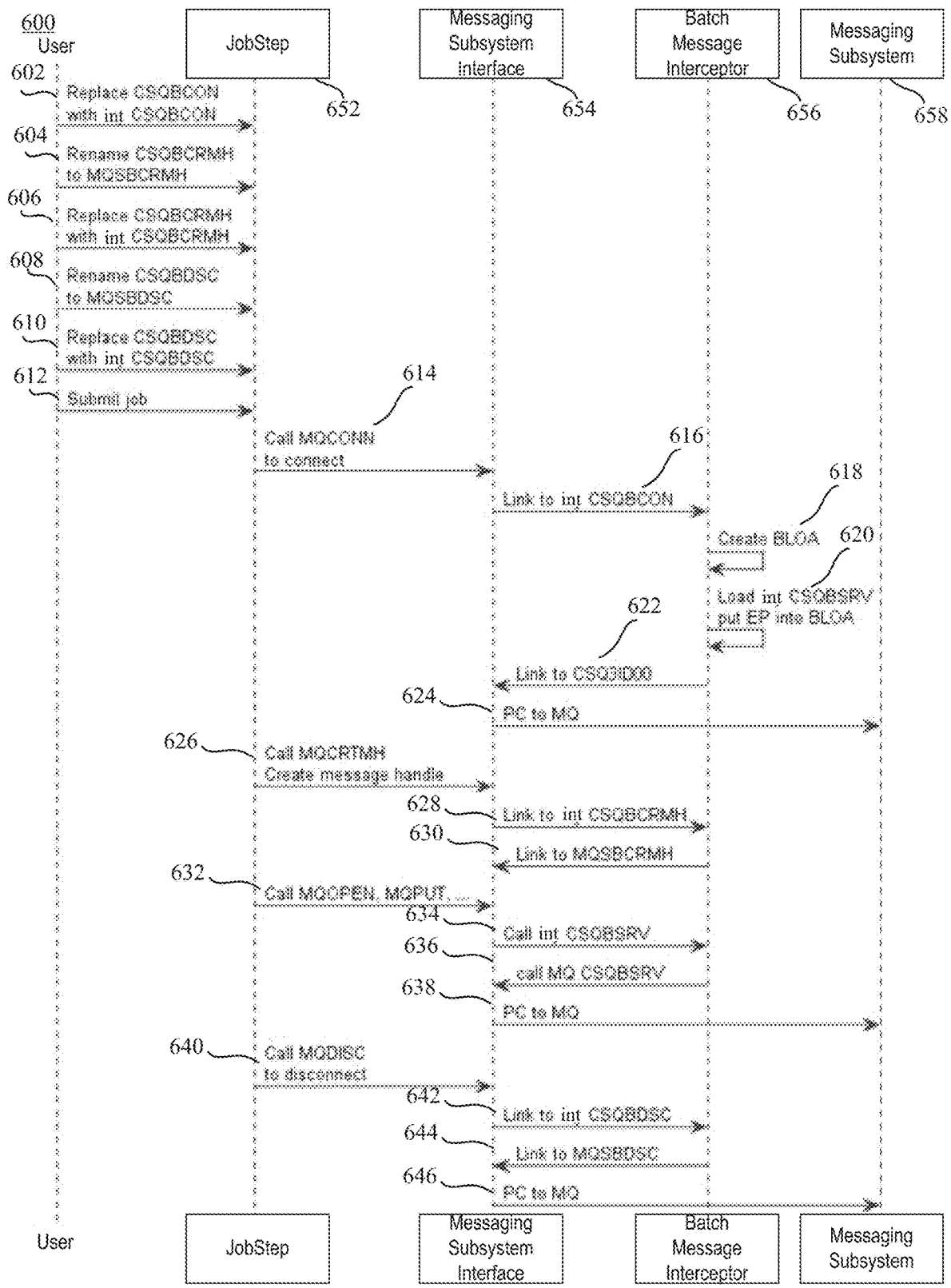
FIG. 6 is a sequence diagram of an example process of intercepting messaging requests originating in a batch processing application, according to an implementation.

FIG. 6 is a sequence diagram 600 of an example process of intercepting messaging requests originating in a batch processing application. Because batch jobs in a mainframe environment are comprised of a series of steps, the sequence diagram 600 includes a series of steps included in the job and are described as user actions. In some implementations, the user may add the steps to the job via a JobStep command runner interface 652. In some implementations, the user may insert the steps via a text editor. The batch message interceptor 656 is an example of the messaging request interceptor 126. The messaging subsystem interface 654 is a documented interface to a messaging subsystem 658, such as the IBM MQ messaging subsystem, that enables the batch job to connect to and use the messaging subsystem 658. Although the sequence diagram shows a single user, the operations shown therein may be performed by multiple different users. For example, some of the operations may be performed by a system administrator while other operations are performed by a user of a client application.

At operations 602-610, a user enables the batch message interceptor 656 by renaming or replacing various modules of the messaging subsystem interface 654. For example, a user may manually rename or replace the modules using, for example, the JobStep command runner interface 652. The user may also execute a script to rename or replace the modules. The modules of the messaging subsystem interface 654 are provided by the messaging subsystem and are used by a batch job to interact with the messaging subsystem 658. For example, the messaging subsystem interface 654 may include multiple components for accessing the messaging subsystem, such as a CSQBCON module, a CSQBCRMH module, and a CSQBDSC module. The batch message interceptor 656 may include corresponding modules, e.g., an intercept CSQBCON module, an intercept CSQBCRMH module, and an intercept CSQBDSC module, etc. In some implementations, the user renames the messaging subsystem modules and replaces the messaging subsystem modules with the intercept modules, e.g., replacing the CSQBCON module of the messaging subsystem interface 654 with the intercept CSQBCON module (602), replaces the CSQBCRMH module of the messaging subsystem interface 654 with the intercept CSQBCRMH module (606) while keeping a copy of the CSQBCRMH module of the messaging subsystem interface 654 with a new name such as MQSBCRMH (604), and replaces the CSQBCON module of the messaging subsystem interface 654 with the intercept CSQBCON module (610) while keeping a copy of the CSQBCON module of the messaging subsystem interface 654 with a new name such as MQSBDSC (608). The batch message interceptor 656 can also include an intercept version of other modules of the messaging subsystem interface 654 such as a CSQBSRV module. A user can replace these modules in a similar manner to that described above using the JobStep command runner interface 652. For example, the user may replace the CSQBSRV module of the messaging subsystem interface 654 with the intercept CSQBSRV module while keeping a copy of the CSQBSRV module of the messaging subsystem interface 654 with a new name such as MQSBSRV.

At operation 612, a user submits a job as a batch program using the Job Step command runner 652. The batch program statically links to a messaging stub interface module that includes entry points for each messaging system function, (e.g., an MQ stub module such as CSQBSTUB). This module can also be referred to as the stub module. In some implementations, the entry points cause other modules of the documented messaging interface to execute to perform the requested messaging subsystem function. The batch program initiates a connection to the messaging subsystem 658 by calling a messaging subsystem connect command, such as MQCONN (614), which causes the stub to link to the intercept CSQBCON module (616). The batch message interceptor 656 then creates a Batch Life of Area (BLOA) control block (618). The BLOA control block is an area of storage that represents a connection to the messaging subsystem 658 from the batch program submitted through the Job Step command runner 652. For example, the BLOA control block may store information that can be used later to send messaging requests from the batch program. The intercept CSQBCON module loads the intercept CSQBSRV module and stores an entry point to the intercept CSQBSRV module in the BLOA (620). The messaging system interface 654 can then use this stored entry point when performing other messaging requests using the connection between the batch program and the messaging subsystem 658.

In some implementations, the batch message interceptor 656 then links to a module of the messaging system interface, such as a CSQ3ID00 module, (622) to make a program call (PC) to the messaging subsystem 658 to initiate the actual connection from the batch program to the messaging subsystem 658 (624). After a successful connection, a connection handle will be returned by the messaging subsystem connect command that points to the BLOA control block.

Depending on the type of messaging system function requested by the batch program, various modules of the batch message interceptor 656 may be called. For example, to perform messaging requests that perform message property functions, the batch program can obtain a message handle by calling a messaging command such as MQCRTMH (626). The stub module links to the intercept CSQBCRMH module (628) because the CSQBCRMH module of the messaging subsystem interface 654 was replaced by the intercept CSQBCRMH module at 606. The intercept CSQBCRMH module then links to the renamed CSQBCRMH module of the messaging subsystem interface 654 (e.g., using its new name, MQSBCRMH).

Alternatively, many of the documented messaging subsystem functions may use a CSQBSRV module of the messaging subsystem interface 654. For example, messaging system functions that open and send a message, such as MQOPEN and MQPUT, would be processed using the CSQBSRV module of the messaging subsystem interface 654. At 632, a command of a type that is processed using CSQBSRV such as open and put, is called. The stub module of the messaging subsystem interface 654 calls the intercept CSQBSRV module (634) because the CSQBSRV module of the messaging subsystem interface 654 was previously replaced by the intercept CSQBSRV module. The intercept CSQBSRV module then calls the renamed CSQBSRV module of the messaging subsystem interface 654 (e.g., using its new name, MQSBSRV) (636) to complete the command with a program call to the messaging subsystem 658 (638).

At 640, a batch program calls a messaging disconnect command, such as MQDISC, to disconnect from the messaging subsystem 658 (640). The stub module of the messaging subsystem interface 654 links to the intercept CSQBDSC module (642) because the CSQBDSC module of the messaging subsystem interface 654 was replaced by the intercept CSQBDSC module at 610. Then at 644, the intercept CSQBDSC module links to the renamed CSQBCDSC module of the messaging subsystem interface 654 (e.g., using its new name, MQSBDSC) to complete the disconnect command with a program call to the messaging subsystem 658 (646).

Although the sequence diagram 600 is illustrated and described with respect to batch programs, the techniques described can also be applied to other programs. In some implementations, the techniques described herein are used with other application programs that use a batch messaging stub, such as the CSQB STUB, CSQRSTB, or CSQBRRSI batch stubs for the IBM MQ messaging subsystem. For example, in some implementations messaging requests from a database application, such as the IBM DB2 database system, are intercepted using the techniques described herein. In some implementations, the DB2 database system is not run in a batch job step but still accesses a messaging subsystem using a batch stub interface. For example, the DB2 user-defined function DSNMQUDF may make calls to a messaging subsystem using a documented messaging interface. makes use of MQI functions, but it does not run in a batch job step. Rather than running as a batch program, the DSNMQUDF user defined function may run in a DB2 controlled started task address space.

Figure 7:
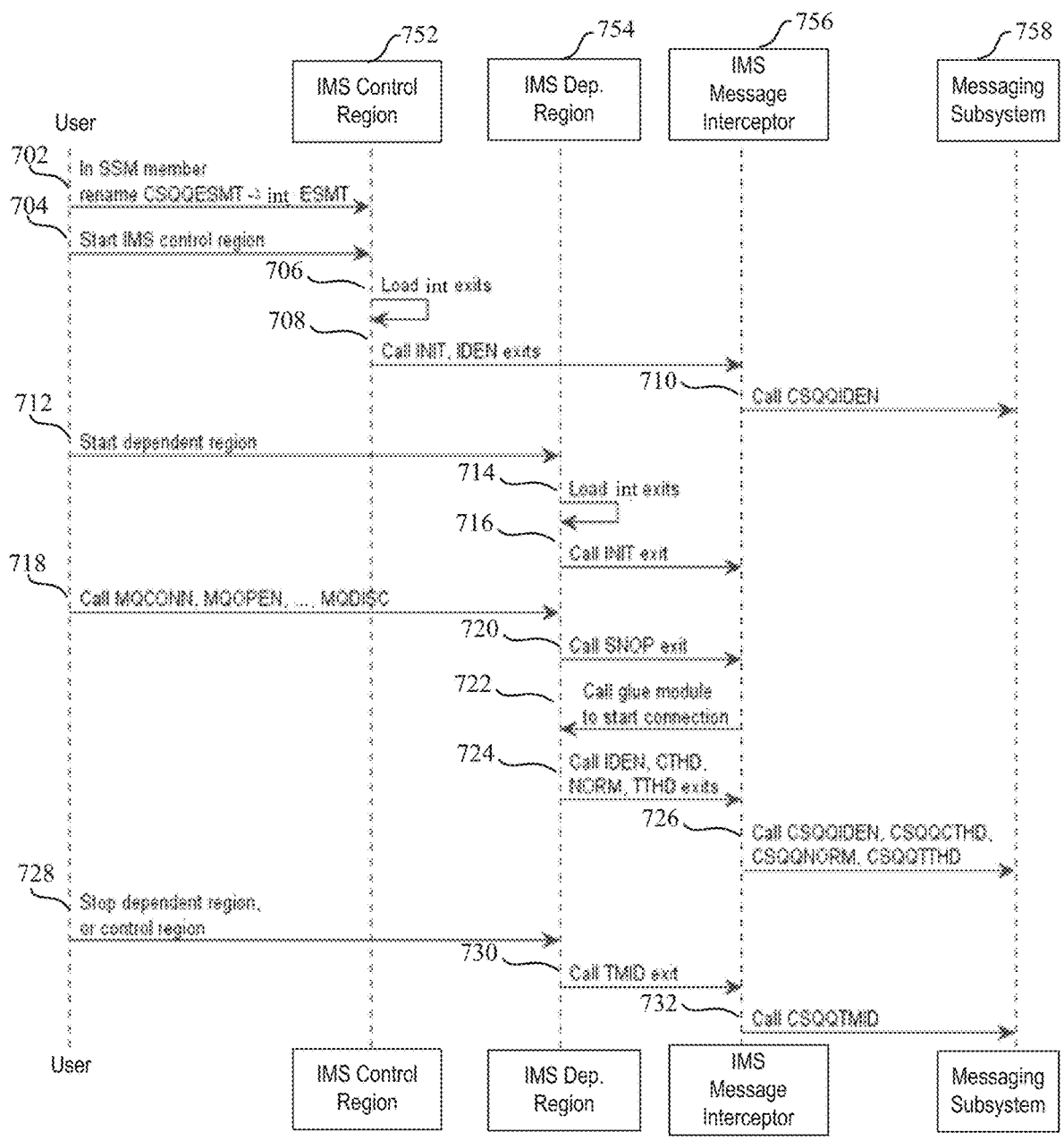
FIG. 7 is a sequence diagram of an example process of intercepting messaging requests originating in an IMS environment, according to an implementation.

FIG. 7 is a sequence diagram 700 of an example process of intercepting messaging requests originating in an IMS environment. The sequence diagram 700 shows a series of operations performed or initiated by user actions. As shown in the diagram, the operations are variously performed by users, an IMS control region 752, an IMS dependent region 754, an IMS message interceptor 756, and a messaging subsystem 758. The IMS message interceptor 756 is an example of the messaging request interceptor 126. Although the sequence diagram shows a single user, the operations shown therein may be performed by multiple different users. For example, some of the operations may be performed by a system administrator while other operations are performed by a user of a client application.

At 702, to enable the IMS message interceptor 756, a user changes a field for the IMS environment that identifies routines associated with the messaging subsystem to reference information associated with information that identifies intercept routines for the messaging subsystem. In some implementations, a user modifies a table that identifies exit routines provided by subsystems external to the IMS control region 752 to include an intercept routine. For example, a user may rename the external subsystem module table (ESMT) in the Subsystem Module (SSM) member of the IMS Procedure Library (PROCLIB) of the IMS control region 752 to reference an interceptor ESMT. The ESMT is an example of a table that identifies exit routines provided by subsystems external to the IMS control region 758. Such a table is loaded when the IMS control region 752 initializes. The IMS message interceptor 756 provides its own version of the ESMT that includes messaging request exit routines that point to the IMS message interceptor 756 rather than the messaging subsystem 758.

Then at 704, the user starts the IMS control region 752. The IMS control region 752 loads the interceptor ESMT and uses the interceptor ESMT to load the messaging request exit routines from the IMS message interceptor 756 (706). The IMS control region calls the initialization exit and the identify exit to connect to the messaging subsystem (708). These exit routines call the IMS message interceptor 756, which then calls an identify exit module, such as CSQQ-IDEN, of the messaging subsystem 758 to connect to the messaging subsystem 758 (710). The identify exit module of the messaging subsystem 758 establishes a shut-down event control block (ECB). The messaging subsystem 758 calls the ECB when the messaging subsystem 758 stops. The IMS control region 752 also calls a resolve exit routine using the ESMT from the IMS message interceptor 756 to resolve any in-doubt transactions. This resolve exit routine calls the IMS message interceptor 756, which loads and calls the corresponding resolve exit routine of the messaging subsystem 758.

At 712, a user starts the IMS dependent region 754. At 714, the IMS dependent region 754 loads the exit routines from the IMS message interceptor 756 based on the ESMT that was configured during step 702. Then the IMS dependent region 754 calls the initialization exit routine (716), which is handled by the IMS message interceptor 756.

At 718, a user (or application program a user is running) calls a messaging command. For example, the messaging command may be called by a client program that includes a statically linked messaging stub interface module that implements a documented messaging interface. The messaging stub interface module identifies a messaging interface adapter for the messaging request.

In some implementations, the first time that an application program issues a messaging system connect request to retrieve a connection handle, e.g., a MQCONN request, the IMS dependent region 754 calls the Subsystem Not Operational (SNOP) exit routine (720) of the IMS dependent region 754. The SNOP exit routine calls a module of the IMS dependent region 754 to start the connection (722), which causes the IMS dependent region 754 to run at least the identify exit routine and the create thread exit routine (724).

These exit routines are directed to the IMS message interceptor 756 based on the ESMT, i.e., the interceptor ESMT, that was configured during step 702. The IMS message interceptor 756 can then make various calls to the messaging subsystem (726). The application program calls a messaging system function to open a message queue, e.g., MQOPEN, to gain access to the messaging queue. Messages are made available to the application call via a MQGET messaging system function and messages may be added to the queue via a MQPUT messaging system function command. Messaging calls that relate to message generation, manipulation, and/or processing use go through these conventional routines. When the application ends or calls a messaging disconnect command, such as MQDISC, IMS calls the terminate thread exit routine.

At 728, a user (or application run by the user) stops the IMS dependent region or control region. Before the region stops, IMS calls the terminate identify exit routine (730), which is directed to the IMS message interceptor 756 by the ESMT that was configured during step 702. The IMS message interceptor 756 then makes a call to complete the terminate identify operation with the messaging subsystem 758, such as a CSQQTMID call (732).

The operations illustrated in the sequence diagrams 500, 600, and 700 are example techniques of intercepting messaging requests in various configurations of a mainframe computing system. Although these methods illustrated intercepting a messaging request, some implementations include additional steps to perform auxiliary functions on the messaging request or to redirect the messaging request. For example, during any of the intercepts (i.e., when the CICS message interceptor 550, the batch message interceptor 656, or the IMS message interceptor 756 has been called), an auxiliary function can be performed or the message request can be redirected to a remote messaging subsystem. Examples of auxiliary functions are described above at least with respect to the messaging request processor 220.

Implementations of the various techniques described herein may be implemented in digital electronic circuitry, or in computer hardware, firmware, software, or in combinations of them. Implementations may implemented as a computer program product, i.e., a computer program tangibly embodied in an machine-readable storage device (e.g., a tangible computer-readable medium that does not include a propagating signal), for processing by, or to control the operation of, data processing apparatus, e.g., a programmable processor, a computer, or multiple computers. In some implementations, a tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a mainframe computer may include at least one processor for executing instructions and one or more memory devices for storing instructions and data. Generally, a mainframe computer also may include, or be operatively coupled to receive data from or transfer data to, or both, one or more mass storage devices for storing data, e.g., magnetic, magneto-optical disks, or optical disks. Information carriers, such as a storage device, suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks but do not include transitory propagating signals. The processor and the memory may be supplemented by, or incorporated in special purpose logic circuitry.

To provide for interaction with a user, implementations may be implemented on a mainframe computer having or communicating with client computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the mainframe computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a mainframe or data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A mainframe computing system comprising:
   at least one general processor;
   a client program comprising instructions that execute in a transaction processing subsystem of the mainframe computing system, wherein the instructions cause the client program to make one or more messaging requests via a messaging stub interface module that implements a messaging interface; and
   an interception subsystem comprising instructions configured to perform operations including:
      performing a server initialization routine to initialize a server component that executes in a privileged mode, the privileged mode allowing the server component to perform configuration operations that could not be performed if the server component were to execute in a standard mode;
      initializing the transaction processing subsystem, wherein the initializing the transaction processing subsystem includes calling the server component to load a replacement messaging interface adapter;
      receiving a messaging request from the client program via the replacement messaging interface adapter, the messaging request being directed to a messaging interface adapter that is identified by the messaging stub interface module, the replacement messaging interface adapter including instructions to intercept messages directed to the messaging interface adapter,
      performing an auxiliary function on the messaging request,
      transmitting the messaging request to a messaging subsystem,
      receiving a response from the messaging subsystem, and
      providing the response to the client program.

2. The mainframe computing system of claim 1, wherein transmitting the messaging request to a messaging subsystem comprises transmitting the messaging request to a destination mainframe computing system that is different from the mainframe computing system on which the client program is executing.

3. The mainframe computing system of claim 2, wherein the interception subsystem is further configured to perform operations including:
   packaging parameters of the messaging request to create packaged parameters, and
   transmitting the packaged parameters to the destination mainframe computing system.

4. The mainframe computing system of claim 3, wherein the interception subsystem is further configured to perform operations comprising:
   unpacking data from the response, and
   providing the unpacked data to the client program.

5. The mainframe computing system of claim 3, wherein packaging parameters of the messaging request comprises retrieving data from control blocks referenced in parameters of the messaging request.

6. The mainframe computing system of claim 2, wherein the mainframe computing system is a first logical partition of a sysplex, and wherein the destination mainframe computing system is a second logical partition of the sysplex.

7. The mainframe computing system of claim 1, wherein the auxiliary function comprises translating at least a portion of the messaging request from a first language to a second language.

8. The mainframe computing system of claim 1, wherein the auxiliary function comprises recording audit information about messaging requests by a user.

9. The mainframe computing system of claim 1, wherein the client program originates from a Customer Information Control System (CICS) subsystem and the interception subsystem includes an intercept bootstrap module, a server component that executes in a privileged mode, and an interceptor module, the CICS subsystem being configured to call the intercept bootstrap module during initialization, the intercept bootstrap module being configured to call the server component, and the server component being configured to modify an entry point associated with the messaging interface adapter to point to the interceptor module.

10. The mainframe computing system of claim 1, wherein the client program originates from an Information Management System (IMS) subsystem and the interception subsystem includes an interceptor external subsystem module table that is configured to replace an external subsystem module table of the IMS subsystem, the interceptor external subsystem module table identifying at least one interceptor module.

11. The mainframe computing system of claim 1, wherein the client program originates from a batch application executing in a batch and the interception subsystem includes a plurality of intercept modules that are usable to replace corresponding modules of a messaging sub system interface.

12. A mainframe computing system comprising:
at least one general processor;
a transaction processing subsystem;
a client program comprising instructions that execute within the transaction processing subsystem, including instructions to make one or more messaging requests via a messaging stub interface module that implements a messaging interface; and
an interception subsystem that includes:
a server component comprising instructions that execute in a privileged mode and cause the server component to perform a server initialization routine prior to initialization of the transaction processing subsystem, wherein the privileged mode allows the server component to perform configuration operations that could not be performed if the server component were to execute in a standard mode,
an intercept bootstrap module comprising instructions that execute during initialization of the transaction processing subsystem and to call the server component, and
a replacement messaging interface adapter comprising instructions to replace a messaging interface adapter that is identified by the messaging stub interface module,
wherein, responsive to being called by the intercept bootstrap module, the server component modifies an entry point associated with the messaging interface adapter to point to the replacement messaging interface adapter.

13. The mainframe computing system of claim 12, wherein the initialization routine of the server component comprises:
generating a first program call number associated with an intercept bootstrap module and a second program call number associated with a program call routine of the server component;
installing the first program call number in a program list table of the transaction processing subsystem to cause the transaction processing subsystem to execute the intercept bootstrap module during initialization of the transaction processing subsystem.

14. The mainframe computing system of claim 13, wherein the initialization routine of the server component further comprises:
storing the second program call number in a common storage location that can be accessed by the intercept bootstrap module; and
storing an address associated with the common storage location in a named token.

15. The mainframe computing system of claim 14, wherein the intercept bootstrap module is configured to:
retrieve the address from the named token;
retrieve the second program call number from the common storage location associated with the address; and
call the second program call number to cause the server component modify an entry point associated with the messaging interface adapter to point to the replacement messaging interface adapter.

16. The mainframe computing system of claim 12, wherein the replacement messaging interface adapter is configured to perform operations including:
intercept a messaging request that is directed to the messaging interface adapter by the messaging stub interface module of the client program,
performing an auxiliary function on the messaging request,
transmitting the messaging request to a messaging subsystem,
receiving a response from the messaging subsystem, and
providing the response to the client program.

17. A computer-implemented method comprising:
performing a server initialization routine to initialize a server component that executes in a privileged mode, the privileged mode allowing the server component to perform configuration operations that could not be performed if the server component were to execute in a standard mode;
initializing a transaction processing subsystem, wherein initializing the transaction processing subsystem includes calling the server component to load a replacement messaging interface adapter comprising instructions to intercept messaging requests directed to a messaging interface module of a messaging subsystem that is identified by a messaging stub interface module that implements a messaging interface;
using the replacement messaging interface adapter to intercept a messaging request being directed from a client program comprising instructions that execute in the transaction processing subsystem to the messaging interface module;
performing an auxiliary function on the messaging request;
transmitting the messaging request to the messaging interface module of the messaging subsystem;
receiving a response from the messaging subsystem; and
providing the response to the client program.

18. The method of claim 17, wherein transmitting the messaging request to a messaging subsystem comprises transmitting the messaging request to a destination mainframe computing system.

19. The method of claim 17, wherein the auxiliary function comprises modifying the content of the messaging request by removing personal information from a field of the messaging request.

20. The method of claim 17, wherein intercepting a messaging request to a messaging subsystem comprises linking to an intercept module based on a messaging subsystem module having been replaced by the intercept module.

* * * * *

UNITED STATES PATENT AND TRADEMARK OFFICE
CERTIFICATE OF CORRECTION

PATENT NO.          : 10,523,603 B2
APPLICATION NO.     : 15/658896
DATED               : December 31, 2019
INVENTOR(S)         : Wood et al.

Page 1 of 1

It is certified that error appears in the above-identified patent and that said Letters Patent is hereby corrected as shown below:

On the Title Page

In Column 2, in Item (74), in "Attorney, Agent, or Firm", Line 1, delete "Bellerman" and insert -- Bellermann --, therefor.

In the Claims

In Column 20, Claim 1, Lines 8-9, delete "instructions configured" and insert -- instructions --, therefor.

In Column 21, Claim 11, Line 25, delete "sub system" insert -- subsystem --, therefor.

Signed and Sealed this
Seventh Day of April, 2020

Andrei Iancu
*Director of the United States Patent and Trademark Office*